(12) United States Patent
Devendranath et al.

(10) Patent No.: US 11,843,548 B1
(45) Date of Patent: Dec. 12, 2023

(54) RESOURCE SCALING OF MICROSERVICE CONTAINERS

(71) Applicant: Dell Products L.P., Round Rock, TX (US)

(72) Inventors: Murali Devendranath, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/078,640

(22) Filed: Dec. 9, 2022

(51) Int. Cl.
| G06F 15/16 | (2006.01) |
| H04L 47/80 | (2022.01) |
| H04L 47/70 | (2022.01) |
| H04L 47/74 | (2022.01) |

(52) U.S. Cl.
CPC .......... *H04L 47/803* (2013.01); *H04L 47/743* (2013.01); *H04L 47/822* (2013.01)

(58) Field of Classification Search
CPC ............................ H04L 47/743; H04L 47/822
See application file for complete search history.

(56) References Cited

U.S. PATENT DOCUMENTS

| 10,594,562 | B1* | 3/2020 | Rastogi | H04L 41/5025 |
| 10,979,436 | B2* | 4/2021 | Lewis | H04L 63/104 |
| 11,334,543 | B1* | 5/2022 | Anwar | G06F 16/254 |
| 11,436,054 | B1* | 9/2022 | Zad Tootaghaj | G06F 9/5027 |
| 11,714,683 | B1* | 8/2023 | Roberts | G06F 9/45558 |
| | | | | 709/223 |
| 2020/0028894 | A1* | 1/2020 | Memon | G06F 3/0605 |
| 2020/0241930 | A1* | 7/2020 | Garg | G06F 9/45558 |
| 2020/0310881 | A1* | 10/2020 | Gonzalez | G06F 9/5027 |
| 2021/0255926 | A1* | 8/2021 | Wang | G06N 5/04 |
| 2022/0035651 | A1* | 2/2022 | Maurya | H04L 67/10 |
| 2022/0129460 | A1* | 4/2022 | Clifford | G06F 9/5072 |

(Continued)

OTHER PUBLICATIONS

"Horizontal Pod Autoscaling", Kubernetes Documentation, available at: https://kubernetes.io/docs/tasks/run-application/horizontal-pod-autoscale/ (last accessed Dec. 9, 2022), last modified Nov. 26, 2022.

(Continued)

*Primary Examiner* — Hieu T Hoang
(74) *Attorney, Agent, or Firm* — Ryan, Mason & Lewis, LLP

(57) ABSTRACT

Methods, apparatus, and processor-readable storage media for resource scaling of microservice containers are provided herein. An example method includes determining a scaling value for at least one microservice of a plurality of microservices for a cluster of a container-based computing environment based on resource utilization information associated with incoming requests to the plurality of microservices and an amount of resources allocated to the cluster; in response to the at least one microservice exceeding the scaling value, reducing a number of resources utilized by the at least one microservice by storing one or more further incoming requests associated with the at least one microservice in a queue; and releasing one or more of the further incoming requests stored in the queue in response to determining that the one or more further incoming requests can be processed without the at least one microservice exceeding the scaling value.

20 Claims, 7 Drawing Sheets

(56) References Cited

U.S. PATENT DOCUMENTS

| | | | |
|---|---|---|---|
| 2023/0114504 A1* | 4/2023 | He | G06F 9/5083 |
| | | | 718/105 |
| 2023/0137673 A1* | 5/2023 | Rowan | G06F 9/5072 |
| | | | 718/102 |
| 2023/0244392 A1* | 8/2023 | Jain | G06F 3/0617 |
| | | | 711/154 |
| 2023/0244966 A1* | 8/2023 | Sharma | G06N 5/043 |
| | | | 706/12 |

OTHER PUBLICATIONS

Linthicum, David, "Scaling containers: The essential guide to container clusters", TechBeacon, available at: https://techbeacon.com/enterprise-it/scaling-containers-essential-guide-container-clusters (last accessed Dec. 9, 2022), published Nov. 17, 2015.

* cited by examiner

RESOURCE SCALING OF MICROSERVICE CONTAINERS

FIELD

The field relates generally to information processing systems, and more particularly to container resource utilization in such systems.

BACKGROUND

Information processing systems increasingly utilize reconfigurable virtual resources to meet changing user needs in an efficient, flexible, and cost-effective manner. For example, cloud-based computing and storage systems implemented using virtual resources in the form of containers have been widely adopted.

SUMMARY

Illustrative embodiments of the disclosure provide techniques for resource scaling of microservice containers. An exemplary computer-implemented method includes determining at least one scaling value for at least one microservice of a plurality of microservices for a given cluster of a container-based computing environment, wherein the at least one scaling value is based at least in part on resource utilization information associated with incoming requests to the plurality of microservices and an amount of resources allocated to the given cluster; in response to the at least one microservice exceeding the at least one scaling value, reducing a number of resources utilized by the at least one microservice by storing one or more further incoming requests associated with the at least one microservice in a queue; and releasing one or more of the further incoming requests stored in the queue in response to determining that the one or more further incoming requests can be processed without the at least one microservice exceeding the at least one scaling value.

Illustrative embodiments can provide significant advantages relative to conventional container scaling techniques. For example, technical problems associated with handling increased loads of microservices are mitigated in one or more embodiments by automatically determining a number of pods to be used in a cluster for a given microservice, and restricting the number of pods for the given microservice in the cluster to that number.

These and other illustrative embodiments described herein include, without limitation, methods, apparatus, systems, and computer program products comprising processor-readable storage media.

DETAILED DESCRIPTION

Figure 1:
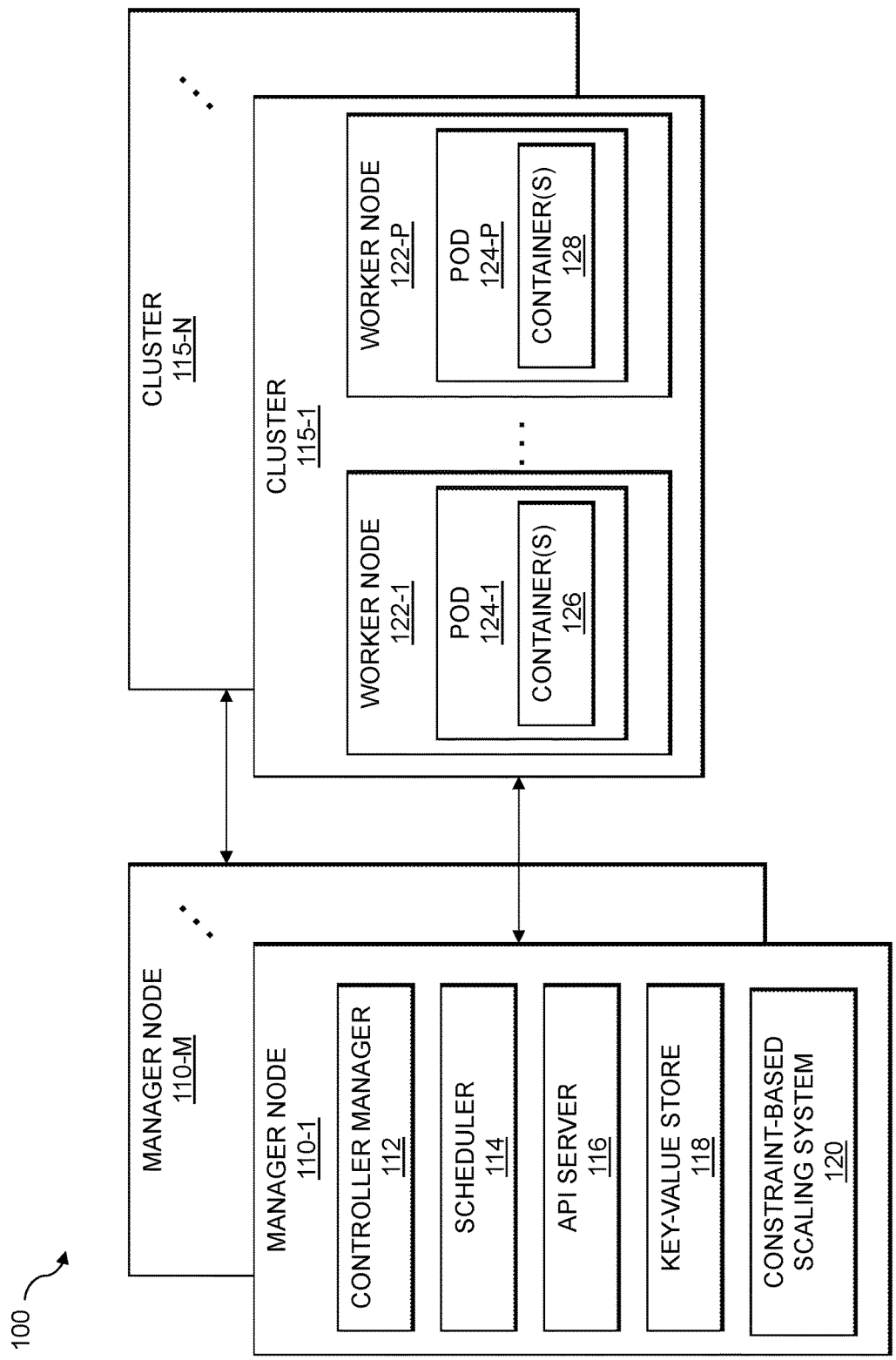
FIG. 1 illustrates a pod-based container environment within which one or more illustrative embodiments can be implemented.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

As the term is illustratively used herein, a container may be considered lightweight, stand-alone, executable software code that includes elements needed to run the software code. A container-based structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a container-based orchestration system, such as a Kubernetes container orchestration system. Kubernetes is an open-source system for automating application deployment, scaling, and management within a container-based information processing system comprised of components referred to as pods, nodes, and clusters, as will be further explained below in the context of FIG. 1. In at least some embodiments, horizontal scaling techniques increase a number of pods as a load (e.g., a number of requests) increases, while vertical scaling techniques assign more resources to existing pods as the load increases.

Types of containers that may be implemented or otherwise adapted within a Kubernetes system include, but are not limited to, Docker containers or other types of Linux containers (LXCs) or Windows containers. Kubernetes has become a prevalent container orchestration system for managing containerized workloads. It is rapidly being adopted by many enterprise-based information technology (IT) organizations to deploy their application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Generally, for a Kubernetes environment, one or more containers are part of a pod. Thus, the environment may be referred to, more generally, as a pod-based system, a pod-based container system, a pod-based container orchestration system, a pod-based container management system, or the like. Furthermore, a pod is typically considered the smallest execution unit in the Kubernetes container orchestration environment. A pod encapsulates one or more containers, and one or more pods can be executed on a worker node. Multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Also, pods may each have persistent storage volumes associated therewith. Configuration information (e.g., configuration objects) indicating how a container executes can be specified for each pod.

FIG. 1 depicts an example of a pod-based container orchestration environment 100 in an illustrative embodiment. In the example shown in FIG. 1, a plurality of manager nodes 110-1, . . . 110-M (herein each individually referred to as a manager node 110 or collectively as manager nodes 110) are operatively coupled to a plurality of clusters 115-1, . . . 115-N (herein each individually referred to as a cluster 115 or collectively as clusters 115). As mentioned above, each cluster 115 is managed by at least one manager node 110.

Each cluster 115 comprises a plurality of worker nodes 122-1, . . . 122-P (herein each individually referred to as a worker node 122 or collectively as worker nodes 122). Each worker node 122 comprises a respective pod, i.e., one of a plurality of pods 124-1, . . . 124-P (herein each individually referred to as a pod 124 or collectively as pods 124). However, it is to be understood that one or more worker nodes 122 can run multiple pods 124 at a time. Each pod 124 comprises a set of containers (e.g., containers 126 and 128). It is noted that each pod 124 may also have a different number of containers. As used herein, a pod may be referred to more generally as a containerized workload. As also shown in FIG. 1, each manager node 110 comprises a controller manager 112, a scheduler 114, an application programming interface (API) server 116, a key-value store 118, and a constraint-based scaling system 120. It is to be appreciated that in some embodiments, multiple manager nodes 110 may share one or more of the same controller manager 112, scheduler 114, API server 116, key-value store 118, and/or constraint-based scaling system 120.

Worker nodes 122 of each cluster 115 execute one or more applications associated with pods 124 (containerized workloads). Each manager node 110 manages the worker nodes 122, and therefore pods 124 and containers, in its corresponding cluster 115. More particularly, each manager node 110 controls operations in its corresponding cluster 115 utilizing the above-mentioned components, e.g., controller manager 112, scheduler 114, API server 116, and key-value store 118. In general, controller manager 112 executes control processes (e.g., controllers) that are used to manage operations in cluster 115. Scheduler 114 typically schedules pods to run on particular worker nodes 122 taking into account node resources and application execution requirements such as, but not limited to, deadlines. In general, in a Kubernetes implementation, API server 116 exposes the Kubernetes API, which is the front end of the Kubernetes container orchestration system. Key-value store 118 typically provides key-value storage for all cluster data including, but not limited to, configuration data objects generated, modified, deleted, and otherwise managed, during the course of system operations.

Figure 2:
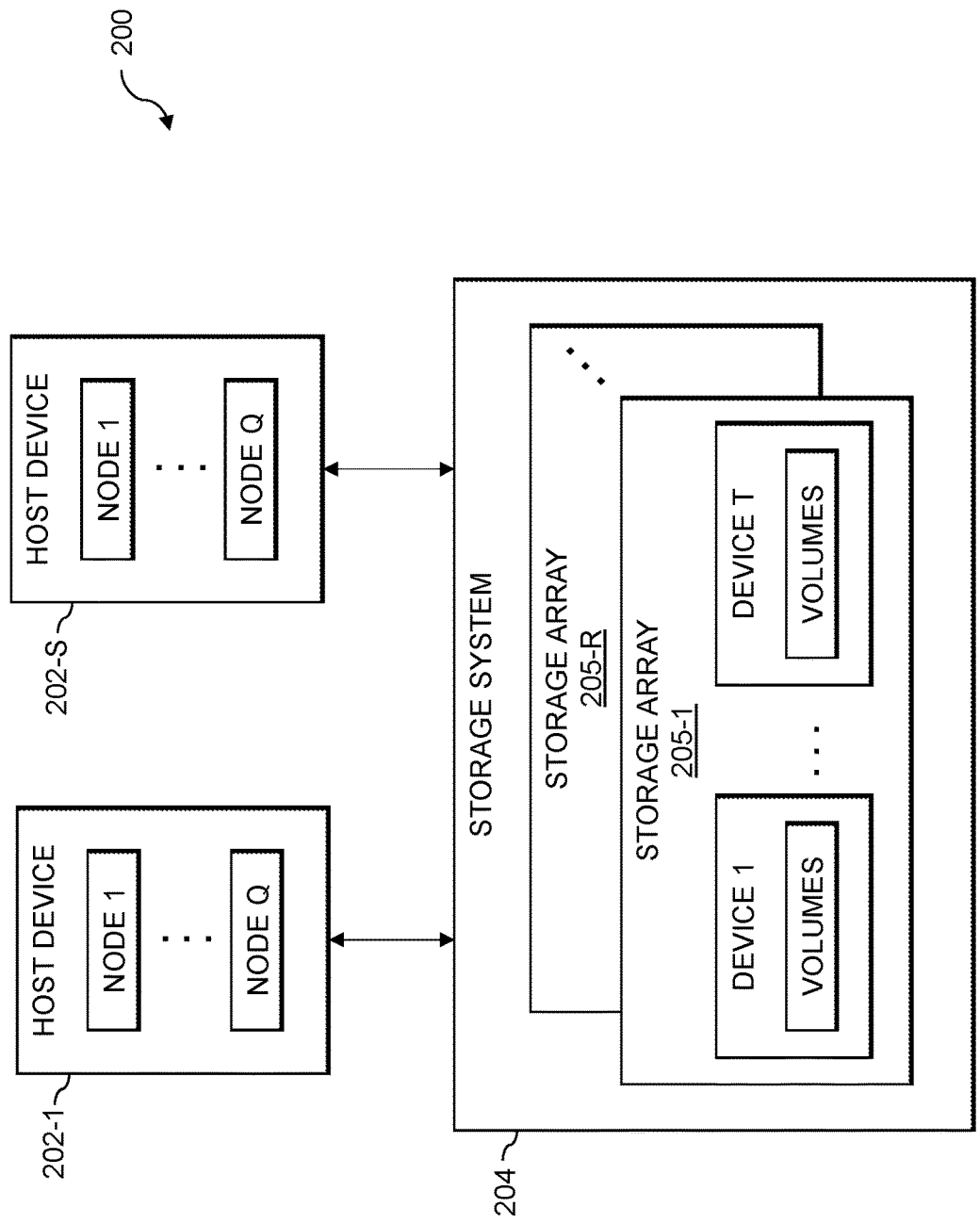
FIG. 2 illustrates host devices and a storage system within which one or more illustrative embodiments can be implemented.

Turning now to FIG. 2, an information processing system 200 is depicted within which the pod-based container orchestration environment 100 of FIG. 1 can be implemented. More particularly, as shown in FIG. 2, a plurality of host devices 202-1, . . . 202-S (herein each individually referred to as a host device 202 or collectively as host devices 202) are operatively coupled to a storage system 204. Each host device 202 hosts a set of nodes 1, . . . Q. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises a plurality of storage arrays 205-1, . . . 205-R (herein each individually referred to as a storage array 205 or collectively as storage arrays 205), each of which is comprised of a set of storage devices 1, T upon which one or more storage volumes are persisted. The storage volumes depicted in the storage devices of each storage array 205 can include any data generated in the information processing system 200 but, more typically, include data generated, manipulated, or otherwise accessed, during the execution of one or more applications in the nodes of host devices 202. One or more storage arrays 205 may comprise a different number of storage devices as compared with one or more other storage arrays 205.

Furthermore, any one of nodes 1, . . . Q on a given host device 202 can be a manager node 110 or a worker node 122 (FIG. 1). In some embodiments, a node can be configured as a manager node for one execution environment and as a worker node for another execution environment. Thus, the components of pod-based container orchestration environment 100 in FIG. 1 can be implemented on one or more of host devices 202, such that data associated with pods 124 (FIG. 1) running on the nodes 1, . . . Q is stored as persistent storage volumes in one or more of the storage devices 1, . . . T of one or more of storage arrays 205.

Host devices 202 and storage system 204 of information processing system 200 are assumed to be implemented using at least one processing platform comprising one or more processing devices each having a processor coupled to a memory. Such processing devices can illustratively include particular arrangements of compute, storage, and network resources. In some alternative embodiments, one or more host devices 202 and storage system 204 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments, and container management systems in illustrative embodiments, such as those depicted in FIGS. 1 and 2, will be described in more detail below in conjunction with additional figures.

It is to be appreciated that these and other features of illustrative embodiments are presented by way of example only, and should not be construed as limiting in any way.

Accordingly, different numbers, types and arrangements of system components can be used in other embodiments. Although FIG. 2 shows an arrangement wherein host devices 202 are coupled to just one plurality of storage arrays 205, in other embodiments, host devices 202 may be coupled to and configured for operation with storage arrays across multiple storage systems similar to storage system 204. The functionality associated with the elements 112, 114, 116, 118, and/or 120 in other embodiments can also be combined into a single module, or separated across a larger number of modules. As another example, multiple distinct processors can be used to implement different ones of the elements 112, 114, 116, 118, and/or 120 or portions thereof.

At least portions of elements 112, 114, 116, 118, and/or 120 may be implemented at least in part in the form of software that is stored in memory and executed by a processor. It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure. The cloud infrastructure may also include one or more private clouds and/or one or more hybrid clouds (e.g., a hybrid cloud is a combination of one or more private clouds and one or more public clouds).

As mentioned above, a Kubernetes pod may be referred to more generally herein as a containerized workload. One example of a containerized workload is an application program configured to provide a microservice. A microservice architecture is a software approach wherein a single application is composed of a plurality of loosely-coupled and independently-deployable smaller components or services.

Container-based microservice architectures have changed the way development and operations teams test and deploy modern software. Containers help companies modernize by making it easier to scale and deploy applications. The pod brings the containers together and makes it easier to scale and deploy applications. Kubernetes clusters allow containers to run across multiple machines and environments: virtual, physical, cloud-based, and on-premises. As shown and described above in the context of FIG. 1, Kubernetes clusters are generally comprised of one manager (master) node and one or more worker nodes. These nodes can be physical computers or virtual machines, depending on the cluster. Typically, a given cluster is allocated a fixed number of resources (e.g., central processing unit (CPU) resources, memory resources, and/or other computer resources), and when a container is defined the number of resources from among the resources allocated to the cluster is specified. When the container starts executing, pods are created on the deployed container that will serve the incoming requests.

Kubernetes clusters, pods, and containers have also introduced new technical problems as pods/containers are scaled within a cluster using a horizontal pod autoscaling (HPA) process, wherein the pod/containers are replicated within the cluster. The HPA process increases the number of pods as the load (e.g., number of requests) increases. Although the HPA process is generally helpful for synchronous and less CPU and memory consuming microservices, container-based platforms are also used for long running workloads, which can be CPU and/or memory intensive. There can be highly critical workloads that cannot afford to fail.

More specifically, Kubernetes enables a multi-cluster environment by sharing and abstracting the underlying compute, network, and storage physical infrastructure, e.g., as illustrated and described above in the context of FIG. 2. With shared compute/storage/network resources, the nodes are enabled and added to the Kubernetes cluster. The pod network allows identification of the pod across the network with PodIPs. With this cluster, a pod can run in any node and scale based on a replica set.

The number of pods needed to run for the cluster can be defined using the replica set. When the container loads, the defined number of pods will be loaded for that service. A larger number of pods means a larger resource allocation. The amount of memory and CPU that the container can use for a cluster and a pod can also be defined. If the load of a microservice in a given cluster increases, then the container generally will continue to spin (e.g., add) additional pods to support the increased load. In some instances, this can cause the container to fail, which results in all of the microservices in that container becoming unresponsive. In such instances, the container will need to be restarted and/or additional resources will need to be allocated to the container. The pending requests for the microservices in that container will also be lost.

Additionally, a given microservice can behave differently in different environments (e.g., a developer environment, system integration testing (SIT) environment, and a production environment) due to differences in the cluster capacity across such environments. Conventional techniques do not provide a mechanism to throttle and/or queue requests, and then release the requests so as to avoid the total consumption of resources in a container.

Illustrative embodiments described herein can automatically determine an expected load for a set of microservices in a container, which can be used to limit the number of new pods that can be created. For example, some embodiments include automatically determining a number of pods for a given microservice and/or a given environment, and restricting the number of pods for the given microservice to the determined number. Additionally, incoming requests for the microservice can be throttled or queued, so that the resources allocated to a given cluster are not exponentially consumed.

Figure 3:
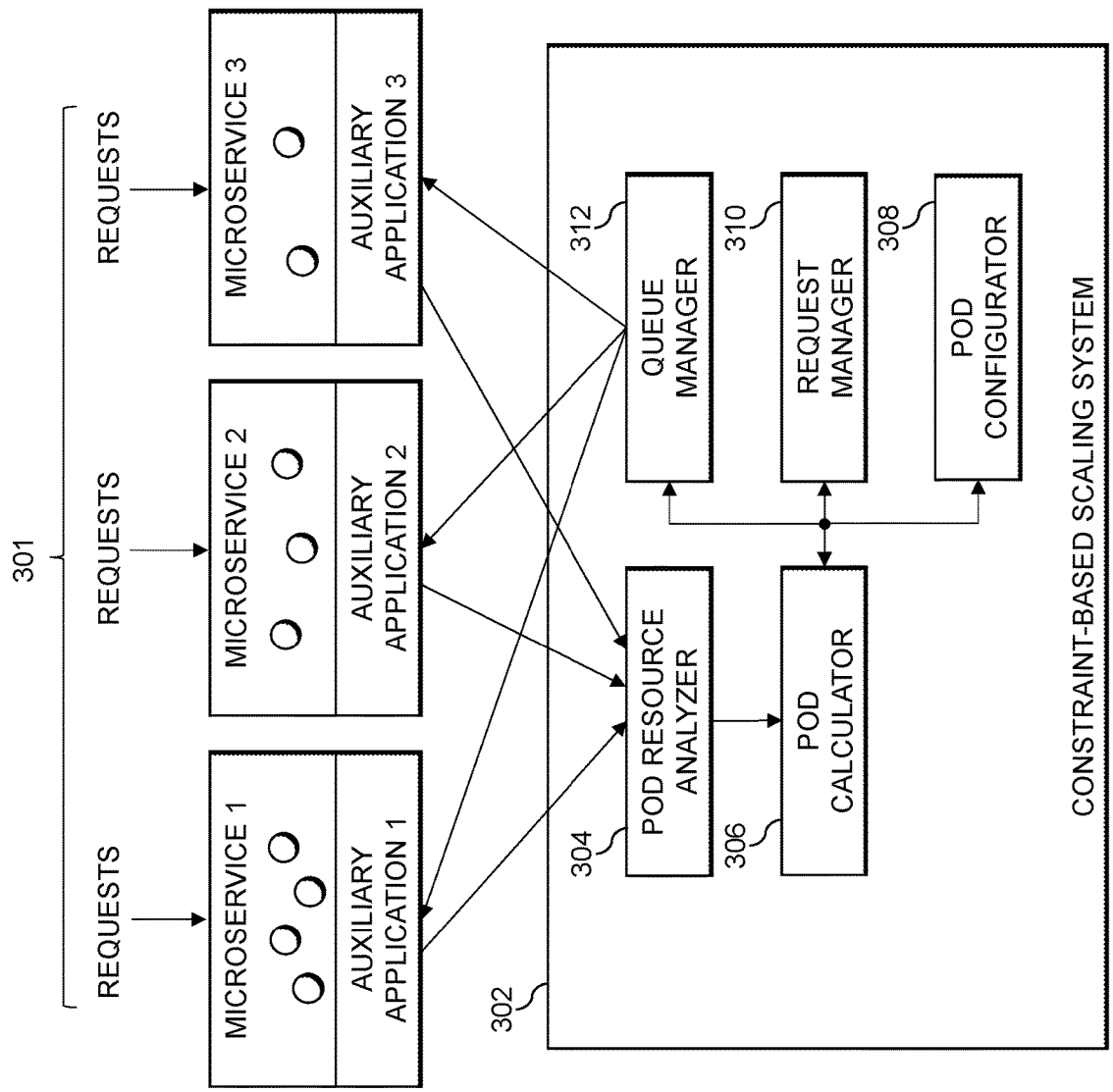
FIG. 3 illustrates a system architecture for scaling of microservice containers according to an illustrative embodiment.

FIG. 3 illustrates a system architecture for scaling of microservice containers according to an illustrative embodiment.

More particularly, the system architecture comprises a plurality of elements, illustratively interconnected as shown. The elements can be configured to implement a scaling process, such as the process described in conjunction with FIG. 4.

The example shown in FIG. 3 includes a constraint-based scaling system 302 (e.g., corresponding to constraint-based scaling system 120), and three microservices (labeled as microservices 1-3), which are assumed to be implemented using a set of pods (as indicated by the circles in FIG. 3). Additionally, each of the microservices are associated with a respective auxiliary application (labeled as auxiliary applications 1-3).

The constraint-based scaling system 302 includes a pod resource analyzer 304, a pod calculator 306, a pod configurator 308, a request manager 310, and a pod queue manager 312. The pod resource analyzer 304 obtains incoming requests 301 from each of the microservices, and resource consumption information from each of the pods in each of the microservices 1-3. The pod resource analyzer 304 then sends the incoming requests and the resource consumption information to the pod calculator 306.

The pod calculator 306 uses this information to calculate a percentage distribution of the incoming requests 301 and the number of pods of each microservice. The pod calculator also calculates an average pod resource consumption for each of the microservices. In some embodiments, a user can configure (e.g., via a user interface) resource allocation thresholds at the container level. For example, a first resource allocation threshold may be for memory resources (e.g., 80%), and a second resource allocation threshold may be configured for CPU resources (e.g., 85%).

By way of example, assume that the number of incoming requests for microservice 1-3 is denoted as X, Y, and Z, respectively. Also assume the following information is collected by the pod resource analyzer 304 for microservice 1-3:

Microservice 1:
  Pod 1: 10 incoming requests; resource consumption is: A1 CPU resources, B1 memory resources.
  Pod 2: 11 incoming requests, and resource consumption is: C1 CPU resources, D1 memory resources.
  Pod 3: 9 incoming requests, and resource consumption is: E1 CPU resources, F1 memory resources.
  Pod 4: 12 incoming requests, and resource consumption is: G1 CPU resources, H1 memory resources.
Microservice 2:
  Pod 1: 12 incoming requests, and resource consumption is: A2 CPU resources, B2 memory resources.
  Pod 2: 14 incoming requests, and resource consumption is: C2 CPU resources, D2 memory resources.
  Pod 3: 16 incoming requests, and resource consumption is: E2 CPU resources, F2 memory resources.
Microservice 3:
  Pod 1: 15 incoming requests, and resource consumption is: A3 CPU resources, B3 memory resources.
  Pod 2: 18 incoming requests, and resource consumption is: C3 CPU resources, D3 memory resources.

In this example, the pod calculator 306 can calculate the percentage distribution of the incoming requests and number of pods as follows:

$$(X/(X+Y+Z))*100=40\%  \quad \text{Microservice 1:}$$

$$(Y/(X+Y+Z))*100=35\%  \quad \text{Microservice 2:}$$

$$(Z/X+Y+Z))*100=25\%  \quad \text{Microservice 3:}$$

The pod calculator 306 can also calculate the average pod resource consumption of the microservice 1-3 as follows:

Average CPU Resource Consumption:

$$(A1+C1+E1+G1)/4=P \quad \text{Microservice 1:}$$

$$(A2+C2+E2)/3=Q \quad \text{Microservice 2:}$$

$$(A3+C3)/2=R \quad \text{Microservice 3:}$$

Average Memory Resource Consumption:

$$(B1+D1+F1+H1)/4=S \quad \text{Microservice 1:}$$

$$(B2+D2+F2)/3=T \quad \text{Microservice 2:}$$

$$(B3+D3)/2=U \quad \text{Microservice 3:}$$

The pod calculator 306 then calculates the average requests serviced by a single pod in each microservice as follows:

$$(10+11+9+12)/4=10.5 \quad \text{Microservice 1:}$$

$$(12+14+16)/3=14 \quad \text{Microservice 2:}$$

$$(15+18)/2=16.5 \quad \text{Microservice 3:}$$

In some embodiments, the average number of requests can be rounded up to the next whole number (e.g., the average number of requests for microservice 1 and microservice 3 can be rounded up to 11 and 17, respectively).

The results above can be used by the pod configurator 308 to configure a constraint-based scaling process (e.g., a constraint-based horizontal scaling process). More specifically, assume a memory threshold (e.g., 80%) of the container is reached. Then, the pod calculator 306 can determine the current resource consumption of each of the microservices 1-3 and compare them to the calculated average distributions. Thus, if microservice 1 is at is presently at 49% average distribution, then the pod calculator 306 can trigger the pod configurator 308 to queue additional incoming requests 301 for microservice 1, since 49% is above the average distribution of 40% calculated for microservice 1.

The request manager 310 begins queuing the incoming requests 301 for microservice 1. More specifically, such requests are queued by the request manager 310 before the requests are processed by an ingress load balancer associated with microservice 1, for example. The pod queue manager 312 is configured to manage the queued requests and release the incoming requests from the queue. More specifically, the pod queue manager 312 can determine the appropriate number of requests that can be released at a given time based on the information, such that the memory threshold of 80% is not exceeded. When the requests begin queueing, the pod consumption will reduce, and the number of pods will eventually be scaled down. In response to the number of requests and number of pods being reduced, pod queue manager 312 can request permission from the pod calculator 306 to release one or more of the queued requests.

When the pod calculator 306 receives the request, it checks the current memory consumption and the average pod consumption. If the sum of the current memory consumption and the average single pod consumption is less than the specified threshold (80%), then the pod calculator 306 sends a message indicating that the pod queue manager can release a number of queued requests equal to the average requests per pod. This allows the pod queue manager 312 to release requests in bulk such that a single pod can handle the requests in parallel. Thereafter, one or more pods can be added to handle the incoming requests 301.

In some embodiments, the pod resource analyzer 304 can be restarted in response to a new microservice or a change to a container allocation. This allows the pod calculator 306 to calculate new values to be used as boundaries for the constraint-based scaling process.

Figure 4:
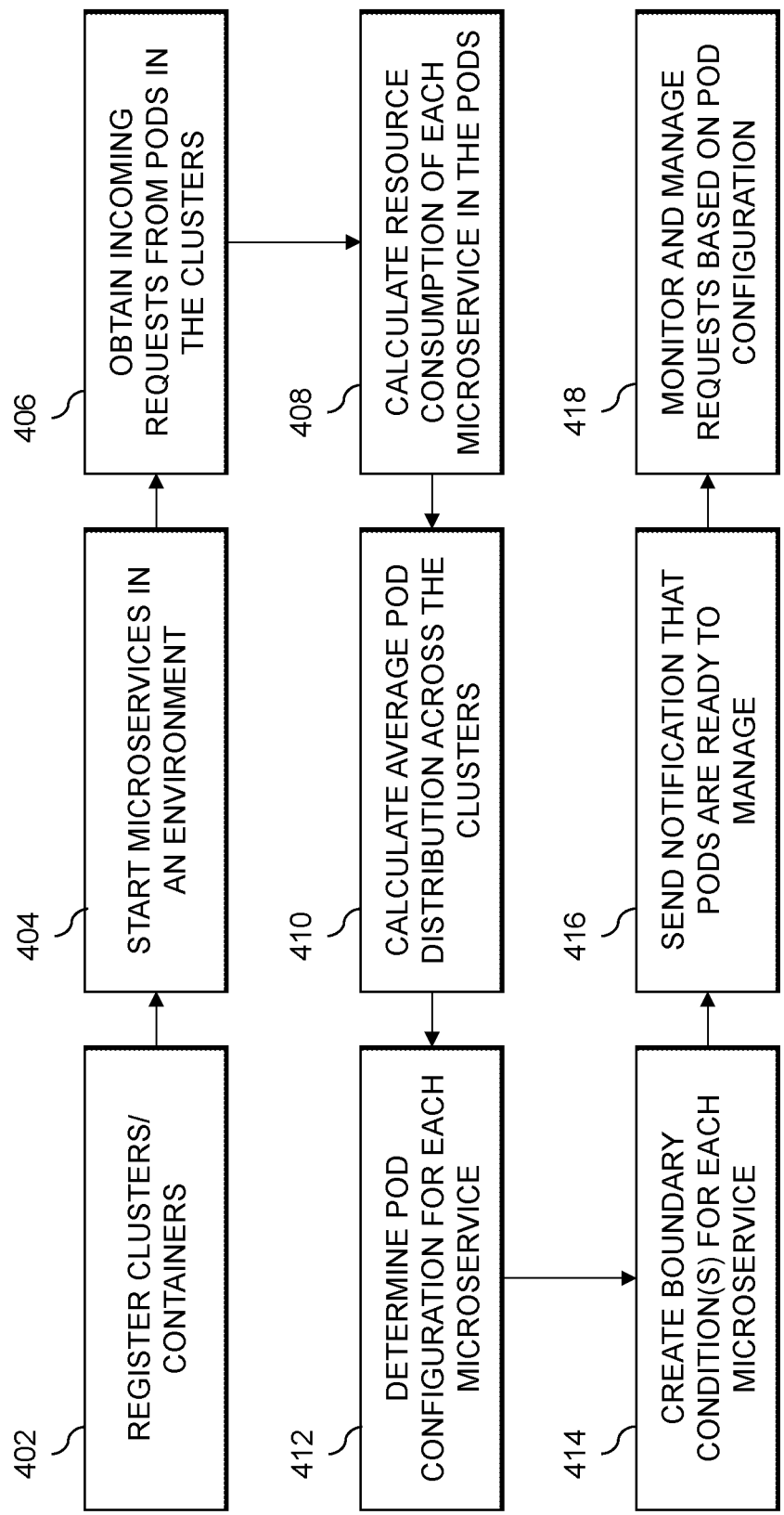
FIG. 4 illustrates a process for scaling of microservice containers according to an illustrative embodiment.

FIG. 4 illustrates a process for scaling of microservice containers according to an illustrative embodiment. In this example, step 402 includes registering one or more clusters and/or one or more containers to participate in a scaling process (e.g., a constraint-based horizontal scaling process). In some examples, the registration may include obtaining requests from auxiliary applications (e.g., a side car container) associated with each of the microservice containers.

Step 404 includes starting each of the microservice containers in a given environment. The microservice containers can be encapsulated within one or more pods that execute across one or more worker nodes of a cluster, for example.

Step 406 includes obtaining incoming requests (e.g., microservice requests) from the pods in the clusters.

Step 408 includes calculating resource consumption of each microservice in the pods based on the requests, and step 410 includes calculating an average pod distribution across the clusters.

Step 412 includes determining a pod configuration for each microservice based on the results of steps 408 and 410. For example, the pod configuration can correspond to a number (e.g., an optimal number) of pods that are allowed for each microservice based on the pod distribution and physical resource allocation of the cluster.

Step 414 includes creating one or more boundary condition(s) for each microservice. For example, a given boundary condition may correspond to a threshold number of resources, such as memory resources or CPU resources.

Step 416 includes sending a notification that the pods are ready to be managed. Step 418 includes monitoring and managing the incoming requests based on the pod configuration. For example, the monitoring can include checking whether incoming requests cause satisfy the boundary conditions. If not, then further incoming requests can be queued until the boundary conditions are satisfied (as described in conjunction with FIG. 3, for example).

Accordingly, some embodiments described herein determine a load (e.g., an optimal load) for each microservice in a container, and limit a scaling process (which in some embodiments is an HPA process) so that the container does not run out of resources. Additional requests can then be queued so that they are not lost, which ensures that all other microservices in the container have enough resources. In at least one embodiment, the queueing system allows requests to be efficiently released in bulk, so that they can be handled in parallel and within the specified scaling limits. Also, one or more embodiments allow a user to manually configure the threshold of resource consumption in a given container, so that at any point of time, the total resource consumption of the microservices do not exceed the threshold even when there are high loads.

Figure 5:
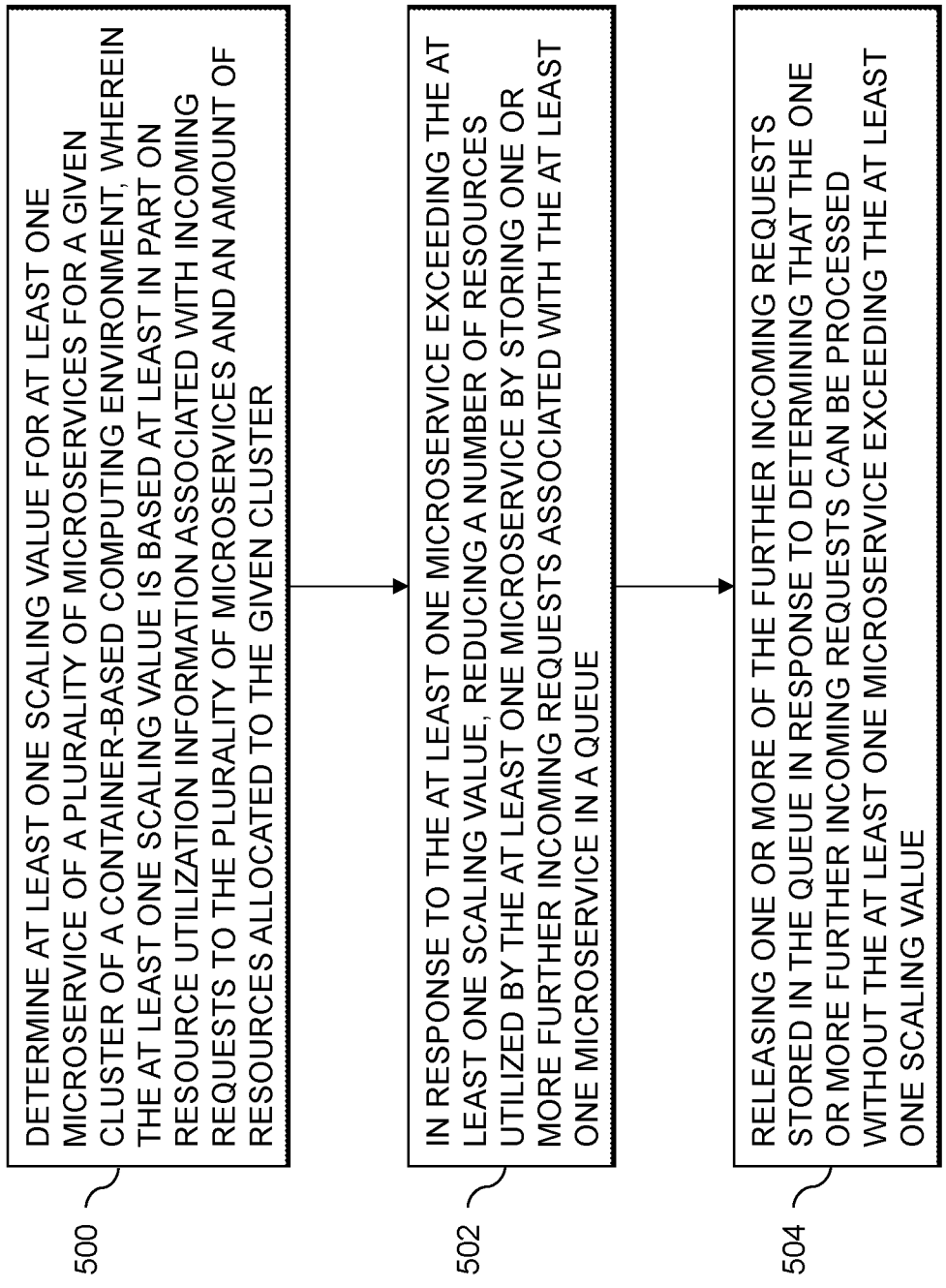
FIG. 5 shows a flow diagram of a process for scaling of microservice containers in an illustrative embodiment.

FIG. 5 is a flow diagram of a process for scaling of microservice containers in an illustrative embodiment. It is to be understood that this particular process is only an example, and additional or alternative processes can be carried out in other embodiments.

In this embodiment, the process includes steps 500 through 504. These steps are assumed to be performed by a manager node 110 utilizing its elements 112, 114, 116, 118, and 120.

Step 500 includes determining at least one scaling value for at least one microservice of a plurality of microservices for a given cluster of a container-based computing environment, wherein the at least one scaling value is based at least in part on resource utilization information associated with incoming requests to the plurality of microservices and an amount of resources allocated to the given cluster.

Step 502 includes in response to the at least one microservice exceeding the at least one scaling value, reducing a number of resources utilized by the at least one microservice by storing one or more further incoming requests associated with the at least one microservice in a queue.

Step 504 includes releasing one or more of the further incoming requests stored in the queue in response to determining that the one or more further incoming requests can be processed without the at least one microservice exceeding the at least one scaling value.

The process may include a step of: deploying a new instance of the at least one microservice in the given cluster to process the one or more further incoming requests that are released from the queue.

A number of the one or more further incoming requests that are released from the queue may be based at least in part on an average resource consumption of one or more other instances of the at least one microservice deployed on the given cluster. The at least one scaling value for the at least one microservice may be determined independently for each of a plurality of deployment environments. The plurality of deployment environments may include: one or more production environments, one or more testing environments, and one or more developer environments. Determining the at least one scaling value may include: calculating a resource consumption associated with each instance of each of the plurality of microservices for the given cluster; and calculating a distribution percentage of the incoming requests to the at least one microservice relative to the incoming requests to the other microservices of the plurality of microservices for the given cluster. The resources allocated to the given cluster may include at least one of: memory resources, processing resources, and network resources. The determining may be performed in response to at least one of: an adjustment to the total amount of resources allocated to the given cluster, and a change to one or more of the plurality of microservices.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the reliability of microservice containers by automatically determining a number of pods to be used in a cluster for a given microservice, and restricting the number of pods for the given microservice in the cluster to that number. These and other embodiments can effectively overcome problems associated with existing scaling techniques (including horizontal scaling techniques) that can cause microservices in a cluster to become unresponsive.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the pod-based container orchestration environment 100 and/or information processing system 200 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers are run on virtual machines in a multi-tenant environment, although other arrangements are possible. The containers are utilized to implement a variety of different types of functionality within the pod-based container orchestration environment 100 and/or information processing system 200. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of pod-based container orchestration environment 100 and/or information processing system 200, these platforms may also be used to implement at least portions of other information processing systems in other embodiments.

Figure 6:
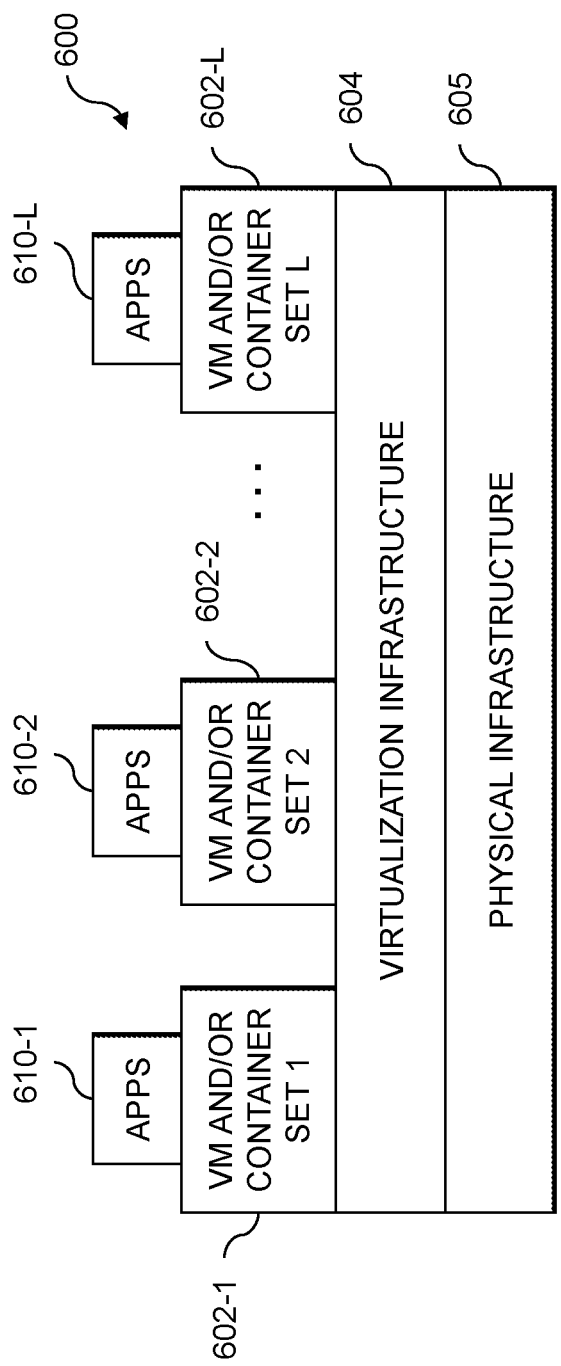
FIGS. 6 and 7 show examples of processing platforms that may be utilized to implement at least a portion of an information processing system in illustrative embodiments.
Figure 7:
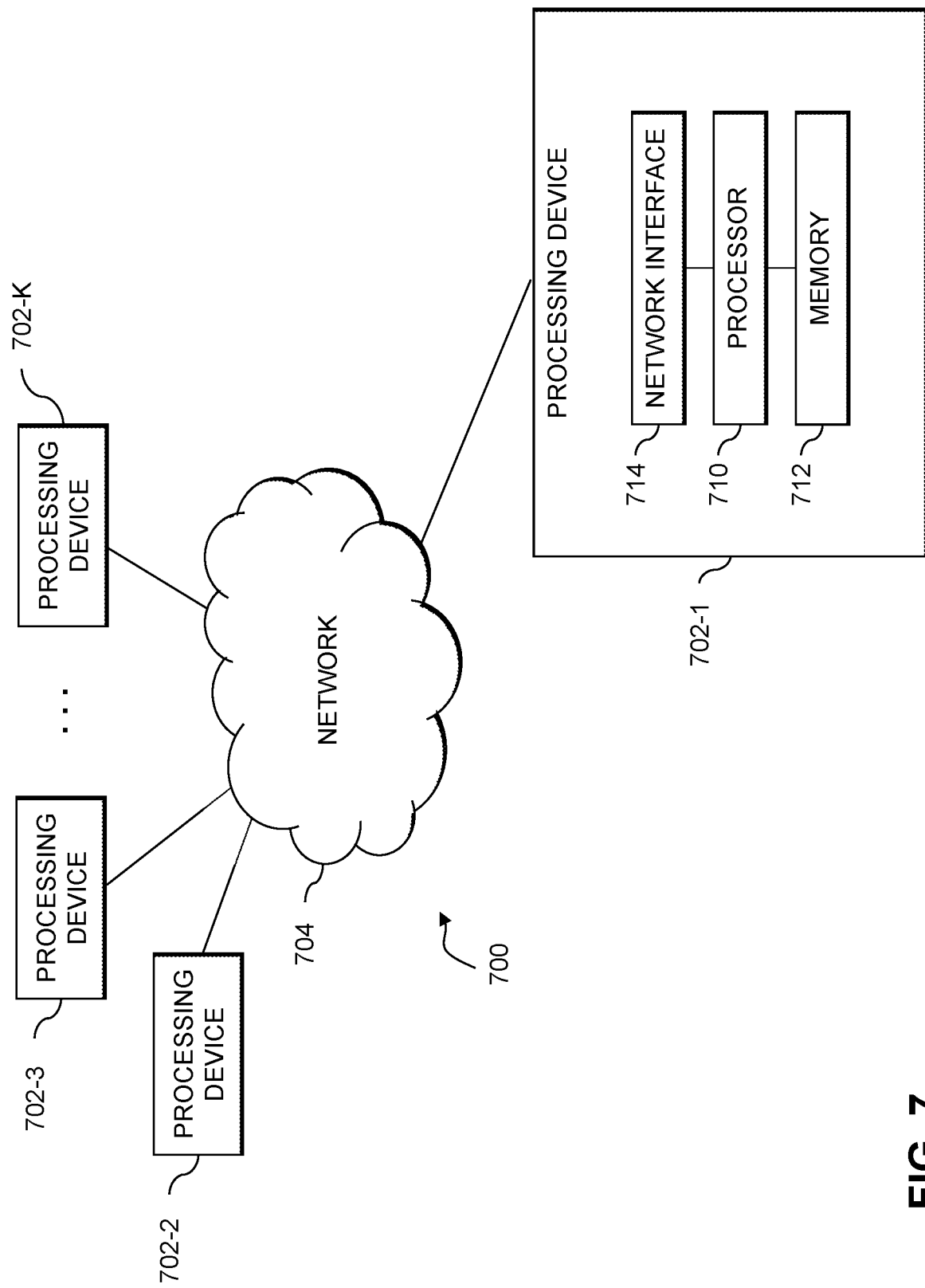

FIG. 6 shows an example processing platform comprising cloud infrastructure 600. The cloud infrastructure 600 comprises a combination of physical and virtual processing resources that are utilized to implement at least a portion of the pod-based container orchestration environment 100 and/or information processing system 200. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of pod-based container orchestration environment 100 and/or information processing system 200 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system pod-based container orchestration environment 100 and/or information processing system 200 and includes a plurality of processing devices, denoted 702-1, 702-2, 702-3, . . . 702-K, which communicate with one another over a network 704.

The processing device 702-1 in the processing platform 700 comprises a processor 710 coupled to a memory 712.

The processor 710 processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and pod-based container orchestration environment 100 and/or information processing system 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the pod-based container orchestration environment 100 and/or information processing system 200. Such components can communicate with other elements of the pod-based container orchestration environment 100 and/or information processing system 200 over any type of network or other communication media.

For example, particular types of storage products that can be used in implementing a given storage system of a distributed processing system in an illustrative embodiment include network-attached storage (NAS), storage area networks (SANs), direct-attached storage (DAS) and distributed DAS, as well as combinations of these and other storage types, including software-defined storage.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
determining at least one scaling value for at least one microservice of a plurality of microservices for a given cluster of a container-based computing environment, wherein the at least one scaling value is based at least in part on resource utilization information associated with incoming requests to the plurality of microservices and an amount of resources allocated to the given cluster;
in response to the at least one microservice exceeding the at least one scaling value, reducing a number of resources utilized by the at least one microservice by storing one or more further incoming requests associated with the at least one microservice in a queue; and
releasing one or more of the further incoming requests stored in the queue in response to determining that the one or more further incoming requests can be processed without the at least one microservice exceeding the at least one scaling value;
wherein the method is performed by at least one processing device comprising a processor coupled to a memory.

2. The method of claim 1, further comprising:
deploying a new instance of the at least one microservice in the given cluster to process the one or more further incoming requests that are released from the queue.

3. The method of claim 1, wherein a number of the one or more further incoming requests that are released from the queue is based at least in part on an average resource consumption of one or more other instances of the at least one microservice deployed on the given cluster.

4. The method of claim 1, wherein the at least one scaling value for the at least one microservice is determined independently for each of a plurality of deployment environments, wherein the plurality of deployment environments comprises: one or more production environments, one or more testing environments, and one or more developer environments.

5. The method of claim 1, wherein the determining the at least one scaling value comprises:
calculating a resource consumption associated with each instance of each of the plurality of microservices for the given cluster; and
calculating a distribution percentage of the incoming requests to the at least one microservice relative to the incoming requests to the other microservices of the plurality of microservices for the given cluster.

6. The method of claim 1, wherein the resources allocated to the given cluster comprise at least one of: memory resources, processing resources, and network resources.

7. The method of claim 1, wherein the determining is performed in response to at least one of:
an adjustment to the total amount of resources allocated to the given cluster, and a change to one or more of the plurality of microservices.

8. A non-transitory processor-readable storage medium having stored therein program code of one or more software programs, wherein the program code when executed by at least one processing device causes the at least one processing device:
to determine at least one scaling value for at least one microservice of a plurality of microservices for a given cluster of a container-based computing environment, wherein the at least one scaling value is based at least in part on resource utilization information associated with incoming requests to the plurality of microservices and an amount of resources allocated to the given cluster;

in response to the at least one microservice exceeding the at least one scaling value, to reduce a number of resources utilized by the at least one microservice by storing one or more further incoming requests associated with the at least one microservice in a queue; and to release one or more of the further incoming requests stored in the queue in response to determining that the one or more further incoming requests can be processed without the at least one microservice exceeding the at least one scaling value.

9. The non-transitory processor-readable storage medium of claim 8, wherein the program code further causes the at least one processing device:

to deploy a new instance of the at least one microservice in the given cluster to process the one or more further incoming requests that are released from the queue.

10. The non-transitory processor-readable storage medium of claim 8, wherein a number of the one or more further incoming requests that are released from the queue is based at least in part on an average resource consumption of one or more other instances of the at least one microservice deployed on the given cluster.

11. The non-transitory processor-readable storage medium of claim 8, wherein the at least one scaling value for the at least one microservice is determined independently for each of a plurality of deployment environments, wherein the plurality of deployment environments comprises: one or more production environments, one or more testing environments, and one or more developer environments.

12. The non-transitory processor-readable storage medium of claim 8, wherein the determining the at least one scaling value comprises:

calculating a resource consumption associated with each instance of each of the plurality of microservices for the given cluster; and calculating a distribution percentage of the incoming requests to the at least one microservice relative to the incoming requests to the other microservices of the plurality of microservices for the given cluster.

13. The non-transitory processor-readable storage medium of claim 8, wherein the resources allocated to the given cluster comprise at least one of: memory resources, processing resources, and network resources.

14. The non-transitory processor-readable storage medium of claim 8, wherein the determining is performed in response to at least one of:

an adjustment to the total amount of resources allocated to the given cluster, and a change to one or more of the plurality of microservices.

15. An apparatus comprising:

at least one processing device comprising a processor coupled to a memory;

the at least one processing device being configured:

to determine at least one scaling value for at least one microservice of a plurality of microservices for a given cluster of a container-based computing environment, wherein the at least one scaling value is based at least in part on resource utilization information associated with incoming requests to the plurality of microservices and an amount of resources allocated to the given cluster;

in response to the at least one microservice exceeding the at least one scaling value, to reduce a number of resources utilized by the at least one microservice by storing one or more further incoming requests associated with the at least one microservice in a queue; and to release one or more of the further incoming requests stored in the queue in response to determining that the one or more further incoming requests can be processed without the at least one microservice exceeding the at least one scaling value.

16. The apparatus of claim 15, wherein the at least one processing device is further configured:

to deploy a new instance of the at least one microservice in the given cluster to process the one or more further incoming requests that are released from the queue.

17. The apparatus of claim 15, wherein a number of the one or more further incoming requests that are released from the queue is based at least in part on an average resource consumption of one or more other instances of the at least one microservice deployed on the given cluster.

18. The apparatus of claim 15, wherein the at least one scaling value for the at least one microservice is determined independently for each of a plurality of deployment environments, wherein the plurality of deployment environments comprises: one or more production environments, one or more testing environments, and one or more developer environments.

19. The apparatus of claim 15, wherein the determining the at least one scaling value comprises:

calculating a resource consumption associated with each instance of each of the plurality of microservices for the given cluster; and calculating a distribution percentage of the incoming requests to the at least one microservice relative to the incoming requests to the other microservices of the plurality of microservices for the given cluster.

20. The apparatus of claim 15, wherein the determining is performed in response to at least one of:

an adjustment to the total amount of resources allocated to the given cluster, and a change to one or more of the plurality of microservices.

* * * * *